(12) United States Patent
Watanabe et al.

(10) Patent No.: US 10,153,598 B2
(45) Date of Patent: Dec. 11, 2018

(54) TERMINAL AND CHARGING CONNECTOR WITH TEMPERATURE MEASUREMENT

(71) Applicant: YAZAKI CORPORATION, Tokyo (JP)

(72) Inventors: Junichi Watanabe, Shizuoka (JP); Hiroshi Moriguchi, Shizuoka (JP); Daisuke Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/890,267

(22) Filed: Feb. 6, 2018

(65) Prior Publication Data

US 2018/0159280 A1    Jun. 7, 2018

Related U.S. Application Data

(63) Continuation of application No. PCT/JP2016/076350, filed on Sep. 7, 2016.

(30) Foreign Application Priority Data

Sep. 7, 2015 (JP) .................................. 2015-175773

(51) Int. Cl.
*H01R 13/66* (2006.01)
*H01R 13/04* (2006.01)
(Continued)

(52) U.S. Cl.
CPC ...... *H01R 13/6683* (2013.01); *B60L 11/1818* (2013.01); *G01K 1/14* (2013.01);
(Continued)

(58) Field of Classification Search
CPC ............ H01R 13/6272; H01R 13/6683; H01R 13/04; H01R 13/6278
(Continued)

(56) References Cited

U.S. PATENT DOCUMENTS 5,760,336 A * 6/1998 Wang .................... H01C 1/024
174/535
5,963,125 A * 10/1999 Mochida ............... H01C 1/024
174/520

(Continued)

FOREIGN PATENT DOCUMENTS

JP    2011-228203 A    11/2011
JP    2012-238534 A    12/2012
(Continued)

OTHER PUBLICATIONS

International Search Report and Written Opinion of the International Search Report for PCT/JP2016/076350 dated Dec. 6, 2016.
(Continued)

*Primary Examiner* — Tulsidas C Patel
*Assistant Examiner* — Peter G Leigh
(74) *Attorney, Agent, or Firm* — Kenealy Vaidya LLP

(57) ABSTRACT

Provided is a charging connector (11) including a terminal (15), a housing (13) which is formed with a lance (33) which prevents the terminal (15) in a terminal receiving chamber 29 from slipping, a front holder (21) which abuts on the lance (33) which prevents slipping of the terminal (15) so as to regulate an engagement release of the lance (33), and a thermistor element (17) which is pressed and biased by the front holder (21) to be brought into close contact with the terminal (15) directly or through a molding resin material.

4 Claims, 13 Drawing Sheets

(51) Int. Cl.
| | |
|---|---|
| H01R 13/405 | (2006.01) |
| H01R 13/58 | (2006.01) |
| B60L 11/18 | (2006.01) |
| H01C 1/01 | (2006.01) |
| G01K 1/14 | (2006.01) |
| G01K 7/22 | (2006.01) |
| H01R 13/627 | (2006.01) |
| H01R 13/422 | (2006.01) |

(52) U.S. Cl.
CPC ............... *G01K 7/22* (2013.01); *H01C 1/01* (2013.01); *H01R 13/04* (2013.01); *H01R 13/405* (2013.01); *H01R 13/582* (2013.01); *H01R 13/4223* (2013.01); *H01R 13/6278* (2013.01)

(58) Field of Classification Search
USPC .............. 439/595, 752, 352; 338/22 R, 226; 29/881, 882
See application file for complete search history.

(56) References Cited

U.S. PATENT DOCUMENTS

| | | | | |
|---|---|---|---|---|
| 6,025,771 A * | 2/2000 | Kobayashi | ........... | H01C 1/1406 338/20 |
| 6,089,927 A * | 7/2000 | Seko | ................. | H01R 13/4365 439/752 |
| 6,091,317 A * | 7/2000 | Lyle | ......................... | G01K 7/22 338/220 |
| 6,172,593 B1 * | 1/2001 | Mochida | ................. | H01C 1/024 338/22 R |
| 6,236,550 B1 * | 5/2001 | Mochida | ................. | H01C 1/024 338/234 |
| 6,407,659 B2 * | 6/2002 | Mochida | .............. | H01C 1/1406 338/22 R |
| 7,347,743 B2 * | 3/2008 | Daugherty | ......... | H01R 13/6272 439/595 |
| 7,384,309 B1 * | 6/2008 | Morello | ............. | H01R 13/4226 29/858 |
| 7,522,030 B2 * | 4/2009 | Kobayasi | ............. | H01C 1/1406 338/22 R |
| 7,666,033 B1 * | 2/2010 | Fung | ................... | H01R 13/7137 439/620.26 |
| 8,174,354 B2 * | 5/2012 | Cohen | ..................... | H01C 1/014 338/22 R |
| 8,376,778 B2 * | 2/2013 | Obata | ................. | H01R 13/4223 439/595 |
| 8,475,207 B2 * | 7/2013 | Obata | ................. | H01R 13/4223 439/595 |
| 8,678,866 B2 * | 3/2014 | Hiraishi | ............. | H01R 13/4365 439/595 |
| 2001/0001549 A1 * | 5/2001 | Mochida | ................. | H01C 1/024 338/22 R |
| 2002/0044040 A1 * | 4/2002 | Mochida | ................. | H01C 1/024 338/22 R |
| 2004/0135663 A1 * | 7/2004 | Jang | ....................... | H01C 1/022 338/22 R |
| 2008/0315983 A1 * | 12/2008 | Oh | ......................... | H01C 1/022 337/14 |
| 2011/0044374 A1 * | 2/2011 | Bergeron | ................ | G01K 1/08 374/208 |
| 2011/0263148 A1 * | 10/2011 | Obata | ................. | H01R 13/4223 439/271 |
| 2012/0289090 A1 * | 11/2012 | Oiri | .................... | H01R 13/4223 439/625 |
| 2013/0109211 A1 * | 5/2013 | Obata | ................. | H01R 13/4223 439/272 |
| 2013/0335874 A1 * | 12/2013 | Chen | ...................... | H01C 1/014 361/106 |
| 2014/0160773 A1 * | 6/2014 | Peters | ..................... | F21V 23/06 362/382 |
| 2014/0364014 A1 * | 12/2014 | Kawamoto | .......... | H01R 13/424 439/692 |
| 2015/0171567 A1 * | 6/2015 | Kawamoto | .......... | H01R 13/665 439/620.21 |
| 2015/0171568 A1 * | 6/2015 | Kawamoto | ........ | H01R 13/6683 439/620.08 |
| 2016/0111831 A1 | 4/2016 | Kawai et al. | | |
| 2016/0126681 A1 * | 5/2016 | Kawai | ................. | H01R 13/582 439/620.21 |

FOREIGN PATENT DOCUMENTS

| | | |
|---|---|---|
| JP | 2015-8099 A | 1/2015 |
| JP | 2015-11797 A | 1/2015 |

OTHER PUBLICATIONS

International Preliminary Report on Patentability and English language Written Opinion of the International Search Report for PCT/JP2016/076350 dated Mar. 13, 2018.

* cited by examiner

TERMINAL AND CHARGING CONNECTOR WITH TEMPERATURE MEASUREMENT

TECHNICAL FIELD

The present invention relates to a connector.

BACKGROUND ART

A charging connector (connector) is known which is provided with a unit of detecting a heating temperature of a terminal connection point (see Patent Literature 1). The charging connector includes a connector housing (not illustrated) having a terminal receiving chamber and a terminal 501 (a terminal with a sensor) received in each terminal receiving chamber. As illustrated in FIG. 13A, the terminal 501 includes a terminal body 507 which has a counterpart terminal contacting part 503 contacted by a counterpart terminal and a sensor fixing part 505, and a thermistor 509 fixed in the sensor fixing part 505. The sensor fixing part 505 is formed in a cylindrical shape into which the thermistor 509 is inserted. A wire 511 connected in the terminal 501 is drawn from the connector housing.

As illustrated in FIG. 13B, the thermistor 509 includes a housing 513 having a rectangular parallelepiped shape and a sensor part (not illustrated) arranged in the housing 513. An output wire 515 from the sensor part is drawn to the outside from the rear end of the housing 513. Lock parts 517 are formed in a pair of side walls of the housing 513, respectively. The lock parts 517 are engaged in engaging holes 519 of the sensor fixing part 505, respectively. Stopper walls 521 protrude in the rear ends of the pair of side surfaces of the housing 513. The pair of stopper walls 521 abut on the rear end surface of the sensor fixing part 505. The sensor part (not illustrated) outputs an electric signal in response to the outer circumferential temperature thereof.

CITATION LIST

Patent Literature

[Patent Literature 1]: JP-A-2015-11797

SUMMARY OF THE INVENTION

Technical Problem

However, as described above, the terminal 501 of the conventional charging connector receives the thermistor 509 in the sensor fixing part 505 having a cylindrical shape and only engages a lock part 517 formed in the side wall of the thermistor 509 in the engaging hole 519 of the sensor fixing part 505. Thus, the terminal 501 and the thermistor 509 cannot be arranged to be brought into close contact, and a temperature-measuring performance may be deteriorated.

The invention has been made in consideration of the above situation, and an object thereof is to provide a connector which can detect a temperature more accurately.

Solution to Problem

The object of the invention is achieved by following configurations.

(1) A connector including:
a terminal;
a housing which has a terminal receiving chamber into which the terminal is inserted, and is formed with a flexible piece which prevents the terminal in the terminal receiving chamber from slipping;
a terminal holding member which is mounted in the housing, and abuts on the flexible piece which prevents slipping of the terminal so as to regulate an engagement release of the flexible piece; and
a thermistor element which is pressed and biased by the terminal holding member mounted in the housing to be brought into close contact with the terminal directly or through a molding resin material.

In the connector of the above-described configuration (1), when the terminal generates heat, the temperature is transmitted to the thermistor element which is brought into close contact with the terminal directly or the molding resin material, and a temperature is detected. In the thermistor element which is pressed and biased by the terminal holding member and is brought into close contact with the terminal, the heat is transmitted from the terminal by thermal conduction. Unlike the conventional structure, in the connector, there is no possibility that a gap is interposed between the terminal and the thermistor element. That is, air having a low thermal conductivity is not interposed between the terminal and the thermistor element, and the thermal conduction is performed directly or through the molding resin material. As a result, since the thermal resistivity is small, the heat is easily transmitted compared to the conventional structure.

In addition, when the terminal holding member is mounted in the housing, the thermistor element is pressed and biased to the terminal directly or through the molding resin material. Thus, the terminal holding member becomes in a press-in structure which receives the counterforce from the terminal. The terminal holding member becomes in the press-in structure, whereby a clearance does not occur due to an external force, a temperature change, and the like between the thermistor element and the terminal.

(2) In the connector of the above-described configuration (1), a thermistor including the thermistor element is molded of the molding resin material, and the thermistor element of the thermistor is pressed and biased toward the terminal by a pressing part which protrudes to be close to a base end side from the insertion tip which abuts on the flexible piece of the terminal holding member mounted in the housing in a direction orthogonal to an inserting direction of the terminal holding member, and is brought into close contact with the terminal directly or through the molding resin material.

In the connector of the above-described configuration (2), the thermistor is molded of the molding resin material while including the thermistor element. The thermistor element may be partially revealed although being covered with the molding resin material. The thermistor is arranged such that the thermistor element faces the terminal mounted in the housing directly or through the molding resin material. Herein, when the terminal holding member is inserted, the thermistor is pressed and biased toward the terminal by the pressing part which protrudes to be close to the base end side from the insertion tip of the terminal holding member abutting on the flexible piece in a direction orthogonal to the inserting direction of the terminal holding member, and is pushed to the terminal. That is, the pressing part of the terminal holding member is pressed and biased toward the terminal by an elastic repulsion force on the insertion tip side of the terminal holding member which is bent and deformed in a direction orthogonal to the inserting direction. Accordingly, the thermistor element can be brought into close contact with the terminal directly in a case where the thermistor element is revealed from the thermistor or through the molding resin material in a case where the thermistor element is covered with the molding resin material.

(3) In the connector of the above-described configuration (1), a thermistor including the thermistor element is molded of the molding resin material, and the thermistor element of the thermistor is pressed and biased by the terminal holding member mounted in the housing in the same direction as an inserting direction of the terminal holding member, so as to be brought into close contact with the terminal directly or through the molding resin material.

In the connector of the above-described configuration (3), the thermistor is formed of the molding resin material while including the thermistor element. The thermistor element may be partially revealed although being covered with the molding resin material. The thermistor is arranged such that the thermistor element faces the terminal mounted in the housing directly or through the molding resin material. Herein, when the terminal holding member is inserted, the thermistor is pressed and biased by the terminal holding member in the same direction as the inserting direction of the terminal holding member, and is pushed to the terminal. That is, the terminal holding member can press and bias the thermistor, which is provided in a position to face the inserting direction, toward the terminal by the inserting force at the time of being mounted in the housing. Accordingly, the thermistor element can be brought into close contact with the terminal directly in a case where the thermistor element is revealed from the thermistor, or through the molding resin material in a case where the thermistor element is covered with the molding resin material.

(4) In the connector of the above-described configuration (1), the terminal holding member is molded of the molding resin material while including the thermistor element, and the thermistor element is pressed and biased by the terminal holding member mounted in the housing, so as to be brought into close contact with the terminal directly or through the molding resin material.

In the connector of the above-described configuration (4), the terminal holding member is molded of the molding resin material while including the thermistor element. The thermistor element may be partially revealed although being covered with the terminal holding member. When the terminal holding member is inserted into the housing, the thermistor element is pushed to the terminal by the terminal holding member. Accordingly, the thermistor element can be brought into close contact with the terminal directly in a case where the thermistor element is revealed from the terminal holding member or through the molding resin material in a case where the thermistor element is covered with the molding resin material forming the terminal holding member.

Advantageous Effects of the Invention

In the connector according to the invention, the temperature detection can be performed more accurately.

Hereinbefore, the invention has been described concisely. Further, the details of the invention will become more apparent when modes (hereinafter, referred to as an "embodiment") for carrying out of the invention (to be described later) is read through with reference to the accompanying drawings.

DESCRIPTION OF EMBODIMENTS

Hereinafter, an embodiment according to the invention will be described with reference to the drawings.

Figure 1:
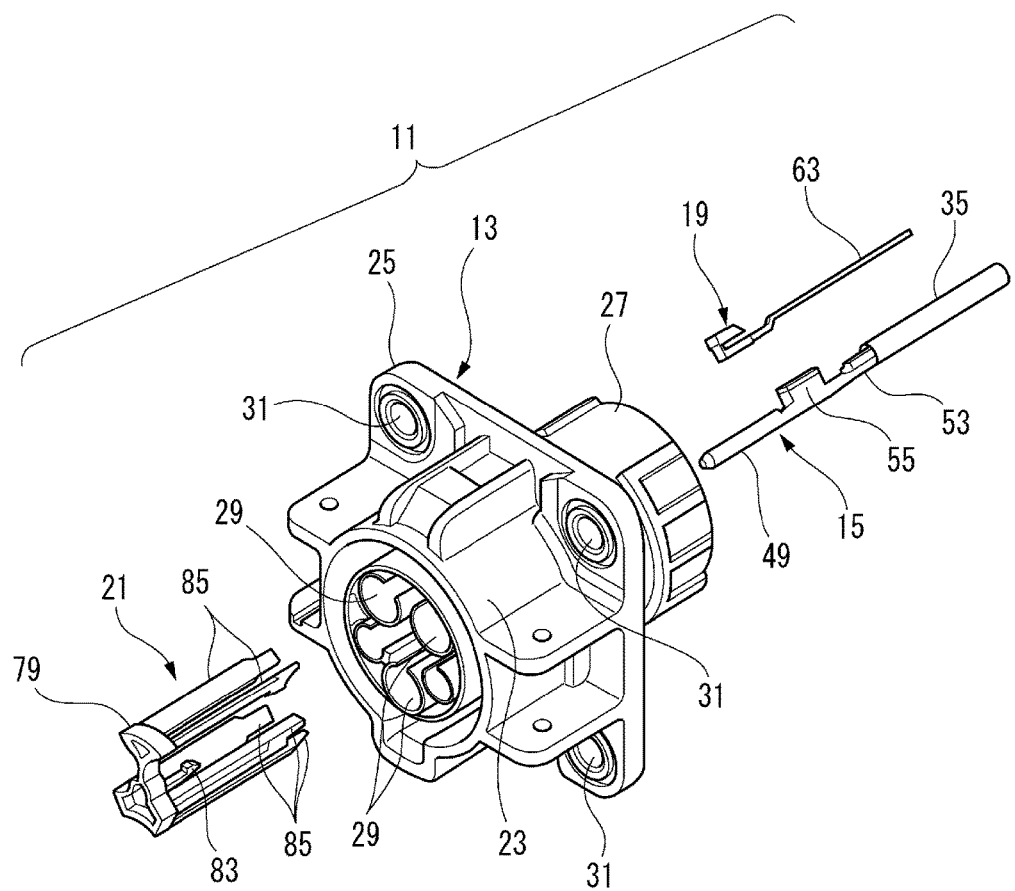
FIG. 1 is an exploded perspective view of a connector according to a first embodiment of the invention.

FIG. 1 is an exploded perspective view of a charging connector 11 which is a connector according to a first embodiment of the invention.

The charging connector 11 according to this first embodiment can be preferably used as a power-receiving side connector mounted in a vehicle, for example. Of course, the connector according to the invention may be used as a power-supplying side connector mounted in the vehicle. The charging connector (connector) 11 includes a housing 13, a terminal 15, a thermistor 19 having a thermistor element 17, and a front holder 21 which is a terminal holding member as main configurations. In this specification, the description is given by using a case where the terminal holding member is the front holder 21 mounted from the front side of the housing 13 as an example. Additionally, the terminal holding member may be a rear holder mounted from the rear side of the housing 13.

Figure 6:
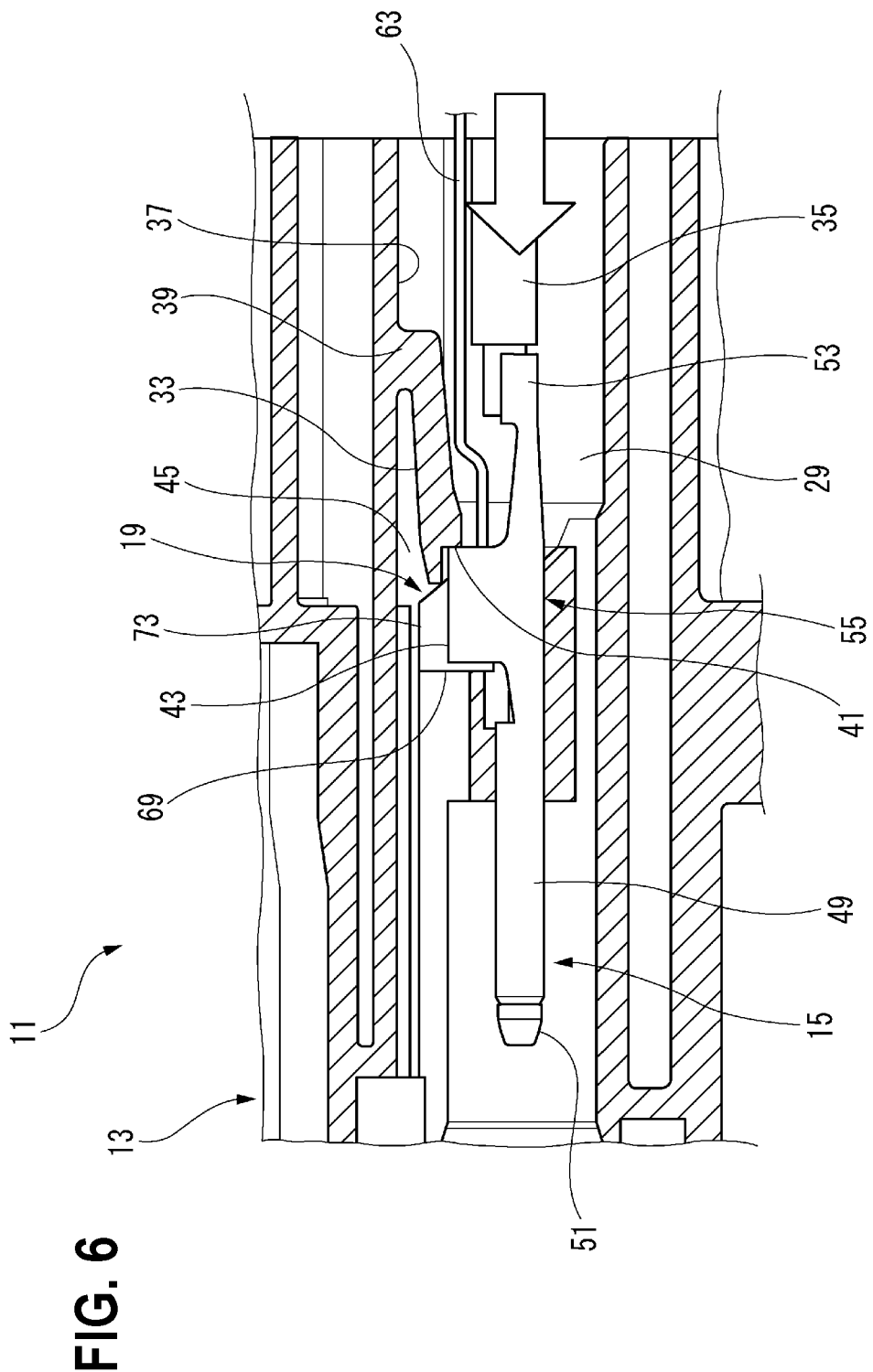
FIG. 6 is a sectional view of main portions for explaining a procedure of inserting the terminal and the thermistor into a housing.

Incidentally, in this specification, "front" indicates the fitting side of the counterpart connector, and "rear" indicates the inserting side of the terminal 15. In addition, "up" indicates a side where a lance 33 as a flexible piece illustrated in FIG. 6 is arranged, and "down" indicates a side where the terminal 15 illustrated in FIG. 6 is arranged. Further, "right and left" indicates a direction which is orthogonal to a front and rear direction and a vertical direction.

As illustrated in FIG. 1, the housing 13 is an insulating resin housing which includes a connector fitting part 23, an attaching flange part 25 protruding sideward from the connector fitting part 23, and an inner cylindrical part 27 protruding to the opposite side to the connector fitting part 23 from the attaching flange part 25. Tip sides of a plurality of terminal receiving chambers 29 are open in the front end surface of the connector fitting part 23, and a counterpart-side female terminal (not illustrated) of the counterpart connector is inserted through the opening. The tip surface of the connector fitting part 23 is open and closed by a lid (not illustrated). The charging connector 11 is fixed by a bolt on a vehicle body side by using an attachment hole 31 of the attaching flange part 25. Each of the terminal receiving chambers 29 is open on the rear end surface of the inner cylindrical part 27. The terminal 15 is inserted through the openings, and is fixed in a predetermined insertion position. The terminal receiving chamber 29 is formed with the lance 33 (see FIG. 7) which fixes the terminal 15 to be prevented from slipping. The wire 35 connected in each of the terminals 15 is drawn in the vehicle body through the opening.

In the lance 33, a base part 39 is connected in a ceiling surface 37 of each of the terminal receiving chambers 29. The lance 33 is formed in a cantilever beam shape supported by the base part 39, and the free end opposite to the base part 39 is arranged in the terminal receiving chamber 29 along an inserting direction of the terminal 15. An engaging step part 41 is formed in the protruding tip lower surface of the lance 33. The engaging step part 41 engages a rear end surface of a top board 43 (to be described later) of the terminal 15, and regulates the rearward slipping of the terminal 15. That is, when the terminal 15 is inserted, the lance 33 is pushed upward by the top board 43 of the terminal 15. When the terminal 15 is inserted to the predetermined position, the engaging step part 41 matches the rear end surface of the top board 43, returns to an original position by an elastic restoring force, and engages the rear end surface of the top board 43. In the terminal receiving chamber 29, an evacuation space 45 in which the protruding tip of the lance 33 pushed upward moves is provided between the ceiling surface 37 and the protruding tip of the lance 33. In the lance 33, a lance regulating rod 81 (to be described later) of the front holder 21 is inserted in the evacuation space 45, so as to regulate the engagement release of the terminal 15. In this specification, a state where the engagement release of the lance 33 with respect to the terminal 15 is regulated by the lance regulating rod 81 is referred to as a double engagement of the terminal 15.

Figure 2:
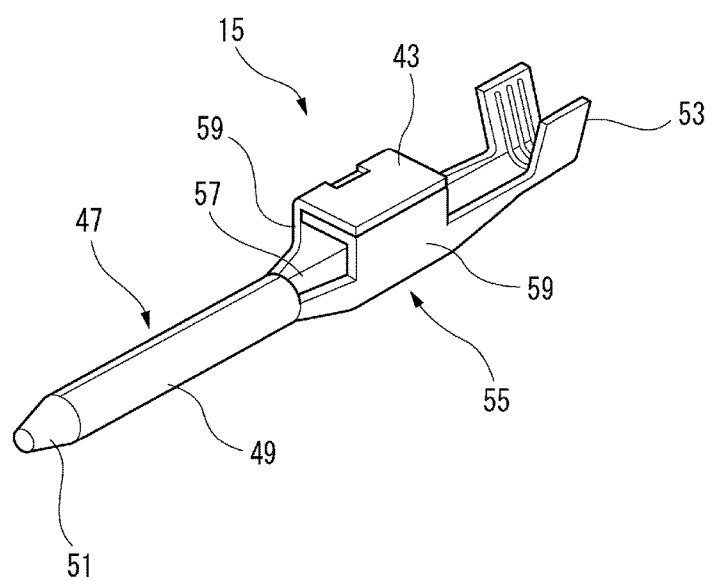
FIG. 2 is an enlarged perspective view of a terminal illustrated in FIG. 1.

FIG. 2 is an enlarged perspective view of the terminal 15 illustrated in FIG. 1.

A plurality of terminals are respectively inserted into the terminal receiving chambers 29. The plurality of terminals are formed of, for example, two receiving side terminals 15 and one ground terminal (not illustrated).

The terminal 15 includes a conductive terminal body 47 and an insulating tip insulation part 51 which is fixed in the terminal body 47 and protrudes forward from the tip of a counterpart terminal contacting part 49. The terminal body 47 is formed by bending a conductive plate having a predetermined shape through a press processing. The terminal body 47 includes the counterpart terminal contacting part 49 contacted by a counterpart female terminal (not illustrated), a wire connection part 53 connected in the wire 35, and a cylindrical sensor fixing part 55 which is provided between the counterpart terminal contacting part 49 and the wire connection part 53. The counterpart terminal contacting part 49 is formed in a cylindrical rod shape. That is, the terminal 15 serves as a male terminal.

In this embodiment, in the terminal 15, the sensor fixing part 55 is formed in a rectangular cylindrical shape in which a conventional thermistor formed in a rectangular parallelepiped shape can be mounted. That is, in the charging connector 11, the terminal 15 can be used as an existing product. In the sensor fixing part 55, a pair of side plate parts 59 are erected from both sides of a bottom plate part 57 illustrated in FIG. 2, and the upper ends of both side plate parts 59 are bent and overlapped so as to be parallel to the bottom plate part 57, whereby the sensor fixing part 55 is formed in a rectangular cylindrical shape. A portion where the upper ends of the side plate part 59 are overlapped serves as the top board 43. Incidentally, if a portion corresponding to the top board 43 is provided in the terminal 15, the terminal 15 may be a new terminal in which the other portion has a different shape in addition to the existing product.

Figure 3A:
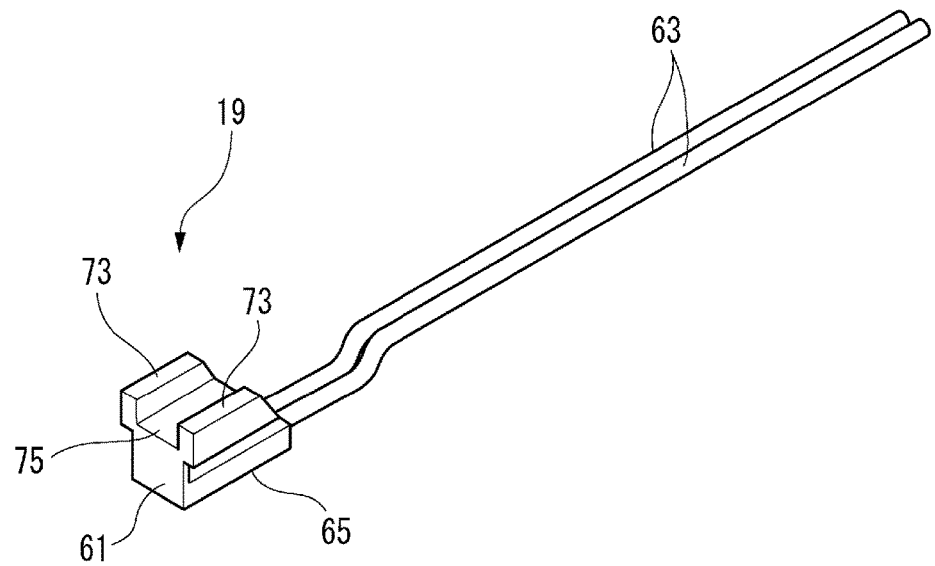
FIG. 3A is an enlarged perspective view of a thermistor illustrated in FIG. 1.

FIG. 3A is a perspective view of the thermistor 19 illustrated in FIG. 1.

In the thermistor 19, a case 61 is molded of a molding resin material. The thermistor element 17 is buried (mold) inside the thermistor 19 (see FIG. 5). The thermistor element 17 may be entirely covered with the molding resin material, or may be partially revealed from a portion facing the top board 43 in the case 61. In a case where the thermistor element 17 is configured to be partially revealed from the portion facing the top board 43 in the case 61, the revealed surface is brought into direct close contact with the top board 43 of the terminal 15. In addition, in a case where the thermistor element 17 is entirely covered (molded) with the case 61, the thermistor element 17 is brought into close contact with the terminal 15 with a thin wall of the molding resin material interposed therebetween. A lead is connected in the thermistor element 17, and the lead is led out as a pair of signal wires 63 from the case 61. In a signal wire 63, a conductor connected in the thermistor element 17 is covered with an insulating cover. In the signal wire 63, the molding resin material of the case 61 adheres to the cover. In the case 61, a portion where the molding resin material adheres to the cover serves as a rectangular plate-shaped base part 65 which leads out the signal wire 63 rearward.

The thermistor 19 is operated by using the thermistor element 17 which is sensitive to a temperature. From this point, the thermistor 19 can be referred to as a heat-sensitive resistor. Any one of a chip type (bead type), a disc type, a thin-film type, a thick-film type, and the like may be used as the shape of the thermistor element 17.

Any one of a NTC (negative temperature coefficient) thermistor in which a resistance decreases with respect to the increase of the temperature, a PTC (positive temperature coefficient) thermistor in which a resistance increases with respect to the increase of the temperature conversely, and a CTR (critical temperature resistor) thermistor in which a resistance drastically decreases when the temperature becomes a certain degree may be used as the thermistor element 17 of the thermistor 19.

Figure 3B:
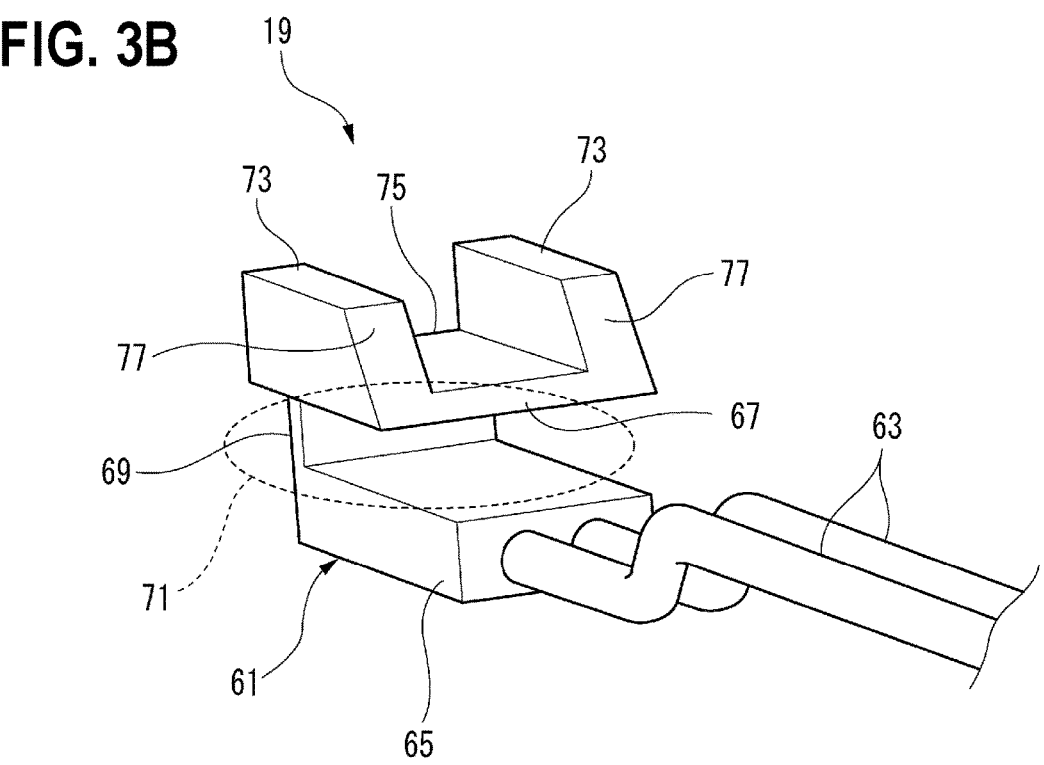
FIG. 3B is an enlarged perspective view of the thermistor of FIG. 3A when viewed from a side of a wire connection.

FIG. 3B is a perspective view of the thermistor 19 illustrated in FIG. 3A when viewed from the side of a wire connection.

The case 61 of the thermistor 19 is formed such that a parallel clamping plate part 67 is connected with the upper side of the base part 65 by a perpendicular plate part 69. That is, the case 61 is formed in a substantially U shape in side view in which the opposite side of the signal wire 63 is connected between the base part 65 and the clamping plate part 67 by the perpendicular plate part 69. A space between the base part 65 and the clamping plate part 67 serves as a terminal engagement space 71. In the thermistor 19, the base part 65 is inserted into the sensor fixing part 55 having the rectangular cylindrical shape, and the clamping plate part 67 is arranged on the opposite side of the base part 65 with the top board 43 interposed therebetween. That is, in the thermistor 19, the perpendicular plate part 69 abuts on the front end surface of the sensor fixing part 55 and is caught in the terminal 15 in a state where the top board 43 is inserted into the terminal engagement space 71. Accordingly, the signal wire 63 of the thermistor 19 is led out from the rear side of the sensor fixing part 55. The thermistor 19 is made to have a U-shaped cross section and is temporarily fixed in the terminal 15 by holding the top board 43, thereby preventing slipping during housing assembly. Incidentally, since the clamping plate part 67 is arranged on the upper surface of the top board 43 on the outside of the sensor fixing part 55, the clamping plate part 67 is formed to be wider than the width of the base part 65 (a distance substantially in a right and left direction of FIG. 3B), compared to the base part 65 which is inserted into the sensor fixing part 55.

A pair of guide walls 73 are erected on both sides of the upper surface of the clamping plate part 67. A space between the pair of guide walls 73 serves as a guide groove 75. At least the engaging step part 41 of the lance 33 can pass through the guide groove 75 when the thermistor 19 engaged in the terminal 15 is inserted into the terminal receiving chamber 29. In addition, the lance regulating rod 81 (to be described) of the front holder 21 can enter the guide groove 75 while being guided. A tilted surface 77 which descends rearward is formed in the rear end surface of the pair of guide walls 73. The tilted surface 77 is provided to avoid interference between the thermistor 19 and the lance 33 when the thermistor 19 is arranged in the terminal receiving chamber 29 together with the terminal 15.

In this embodiment, the thermistor element 17 is buried into the clamping plate part 67 of the thermistor 19. The thermistor element 17 may be entirely covered with the molding resin material, and the lower surface in the same drawing may be revealed through the lower surface of the clamping plate part 67. The lead connected in the thermistor element 17 passes through the clamping plate part 67, the perpendicular plate part 69, and the base part 65, and serves as the signal wire 63. The lead may be a conductor of the signal wire 63. In addition, the lead is a separate body from the conductor of the signal wire 63, but may be connected in the conductor of the signal wire 63. In any case, the cover of the signal wire 63 connected in the lead is molded of the molding resin material forming the base part 65.

Figure 4:
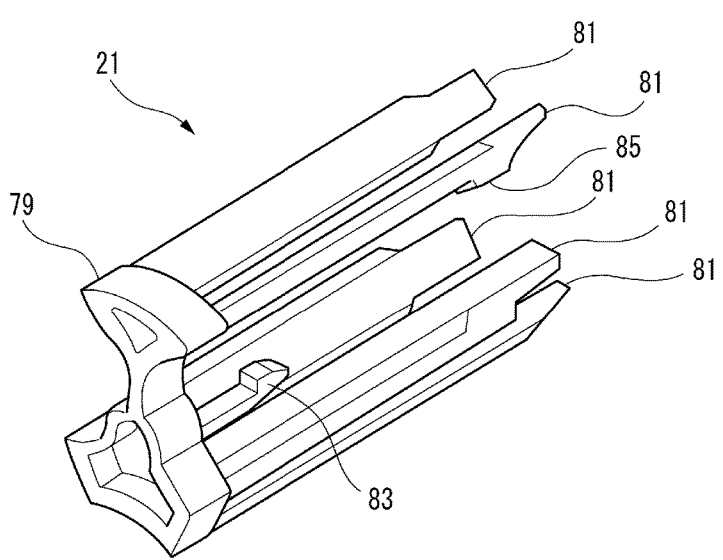
FIG. 4 is an enlarged perspective view of a terminal holding member illustrated in FIG. 1.

FIG. 4 is a perspective view of the terminal holding member illustrated in FIG. 1.

The front holder 21 includes an arm supporting plate 79 which is attached in the front end surface of the connector fitting part 23 in the housing 13. The arm supporting plate 79 includes, on the surface facing the connector fitting part 23 from the lower side, the central lance regulating rod 81, a pair of right and left lance regulating rods 81 thereabove, and further a pair of right and left lance regulating rods 81 thereabove. In each of the lance regulating rods 81, the base end is supported by the arm supporting plate 79, and the insertion tip serves as a free end. In addition, the arm supporting plate 79 includes a holder claw 83 above the central lance regulating rod 81. The holder claw 83 is engaged in a holder engaging part (not illustrated) of the housing 13, so as to regulate the separation of the front holder 21 from the housing 13.

When the front holder 21 is mounted in the housing 13, the insertion tip of the lance regulating rod 81 is inserted into the evacuation space 45 of the lance 33. That is, the lance regulating rod 81 regulates the movement of the lance 33, which engages the terminal 15, to the evacuation space 45 and performs a double engagement which ensures the engagement of the terminal 15. A depressing protrusion 85 as a pressing part protrudes to be slightly close to the base end side from the insertion tip of the lance regulating rod 81 in a direction orthogonal to the inserting direction of the lance regulating rod 81. The depressing protrusion 85 enters the guide groove 75 of the thermistor 19, and presses and biases the clamping plate part 67 of the thermistor 19 toward the top board 43 of the terminal 15 (see FIG. 7).

As described above, in the charging connector 11 according to this embodiment, the thermistor 19 is formed of the case 61 molded of the molding resin material while including the thermistor element 17. The thermistor element 17 of the thermistor 19 is pressed and biased by the front holder 21 mounted in the housing 13 in a direction orthogonal to the inserting direction of the front holder 21, and is brought into close contact with the terminal 15 directly or through the molding resin material.

Incidentally, in the description in which the thermistor element 17 "is brought into close contact with the terminal 15 directly or through the molding resin material", the description of "directly" includes a case where only the thermistor element 17 is brought into direct close contact, and a case where the thermistor element 17 is partially covered with the molding resin material and the revealed thermistor element 17 is partially brought into direct close contact. In addition, the description of "is brought into close contact through the molding resin material" indicates a case where the thermistor element 17 is covered with the molding resin material for molding the case 61 and the thermistor element 17 is brought into close contact with the terminal 15 with the thin wall of the molding resin material interposed therebetween, or a case where a heat collection plate or a plating layer is further provided around the molding resin material covering the thermistor element 17 and is brought into close contact with the terminal 15.

Next, the description will be given about a procedure of assembling the charging connector 11 having the above-described configuration.

Figure 5:
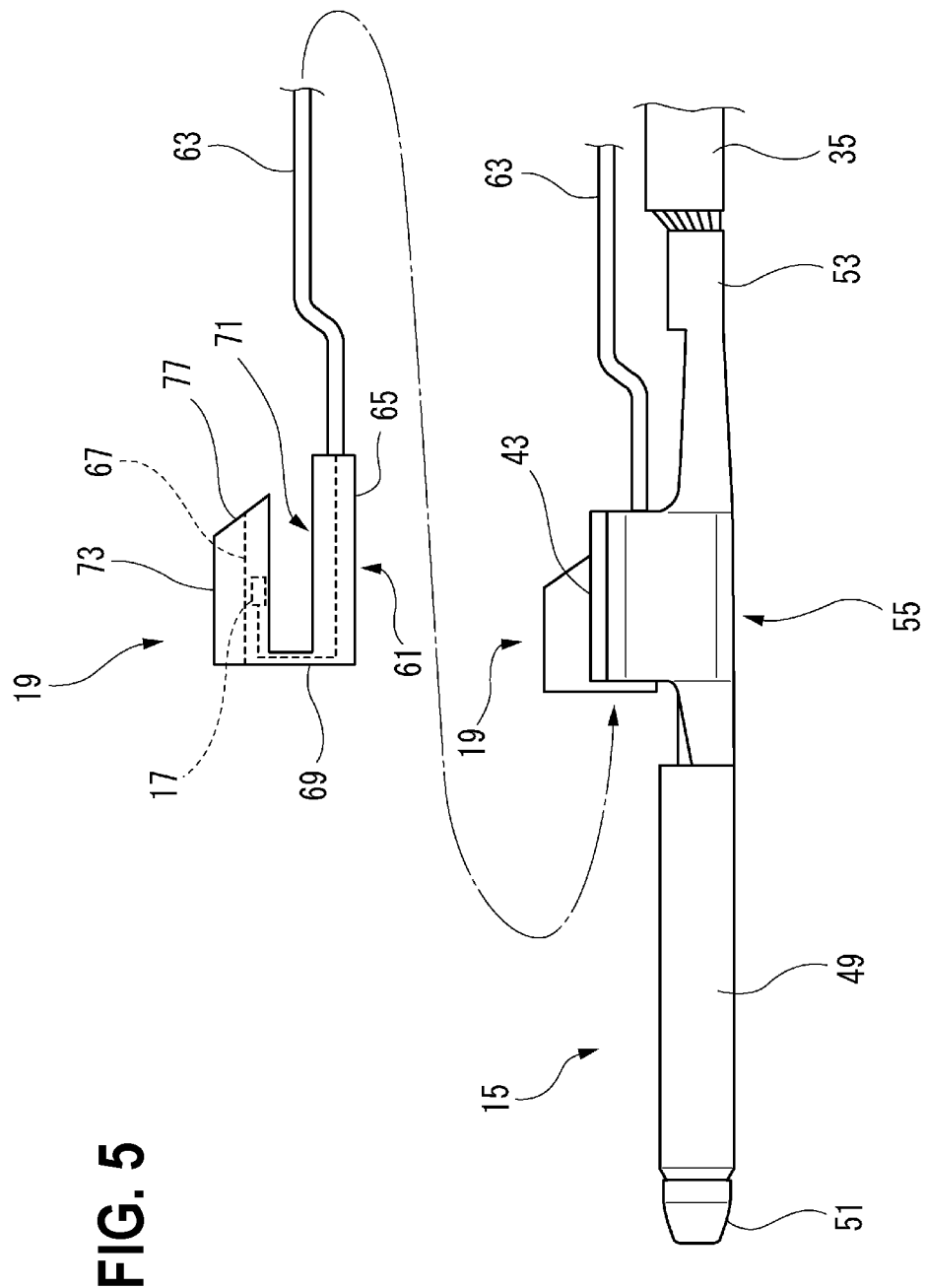
FIG. 5 is a front view for explaining a procedure of assembling the thermistor in the terminal.
Figure 7:
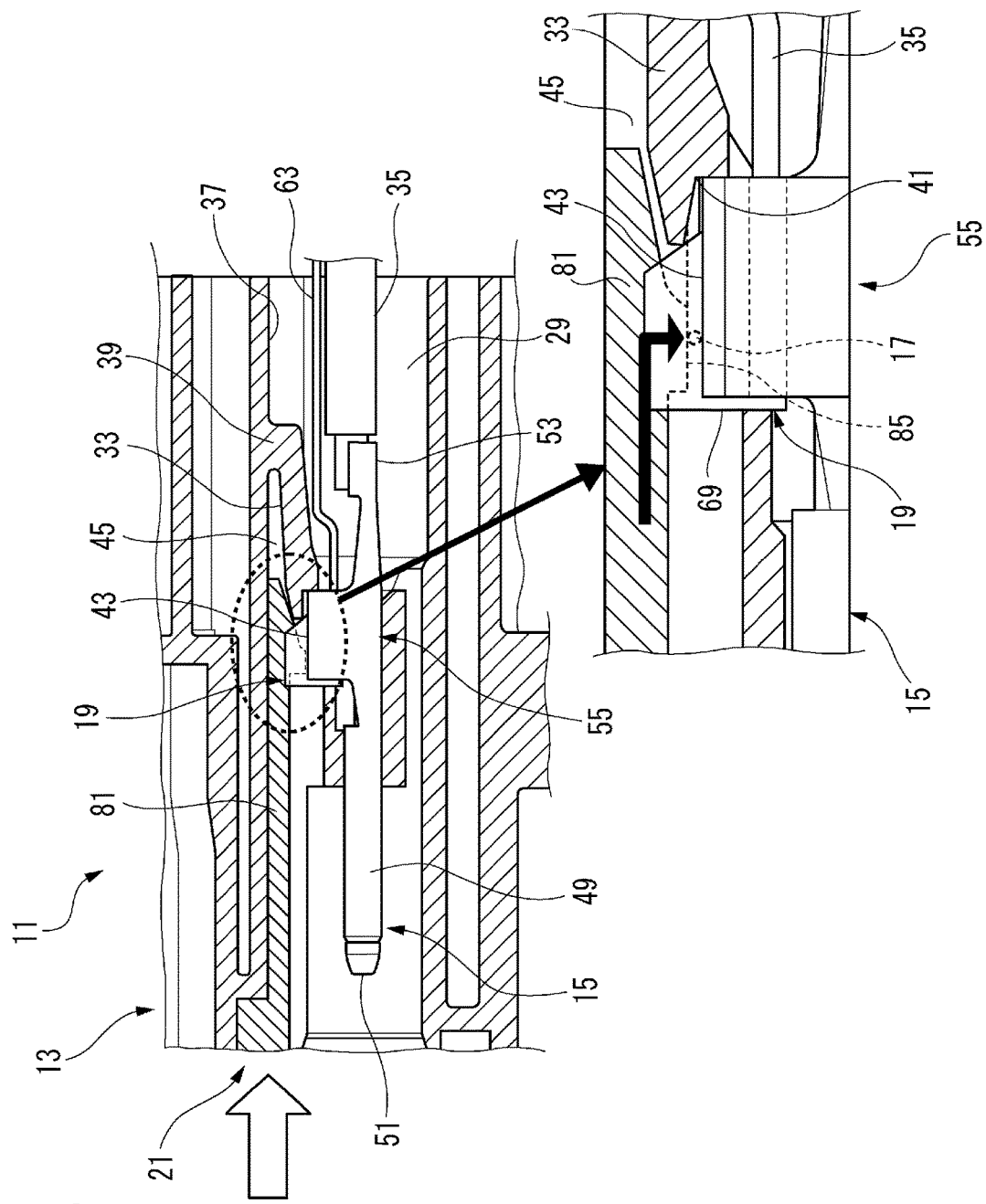
FIG. 7 is a sectional view of main portions and a partially enlarged view for explaining the procedure of inserting the terminal holding member into the housing.

FIG. 5 is a sectional view of main portions for explaining a procedure of assembling the thermistor 19 in the terminal 15, FIG. 6 is a sectional view of main portions for explaining a procedure of inserting the terminal 15 and the thermistor 19 into the housing 13, and FIG. 7 is a sectional view of main portions and a partially enlarged view for explaining a procedure of inserting the front holder 21 into the housing 13.

When the charging connector 11 is assembled, first, as illustrated in FIG. 5, the base part 65 of the thermistor 19 is inserted from the front side into the sensor fixing part 55 of the terminal 15. The signal wire 63 passes from the front side of the sensor fixing part 55 in advance. Accordingly, the thermistor 19 is in a state where the terminal engagement space 71 is caught in the top board 43.

As illustrated in FIG. 6, the thermistor 19 is inserted into the terminal receiving chamber 29 together with the terminal 15 by binding the signal wire 63 with the wire 35 connected in the terminal 15. The thermistor 19 is arranged to the front side of the lance 33 by sliding the lance 33 to the guide groove 75. At this time, the lance 33 is placed on the guide groove 75 and elastically deformed to move to the evacuation space 45. When the terminal 15 is inserted to the predetermined position, the rear end of the sensor fixing part 55 matches the engaging step part 41 of the lance 33. When the engaging step part 41 matches the rear end of the sensor fixing part 55, the placed state of the lance 33 is released, and the lance 33 returns to an original position by the elastic restoring force and engages the rear end surface of the sensor fixing part 55 to regulate the rearward slipping of the terminal 15.

As illustrated in FIG. 7, the front holder 21 is inserted into the housing 13 mounted with the terminal 15. In the front holder 21 mounted in the housing 13, the insertion tip of the lance regulating rod 81 is inserted into the evacuation space 45 of the lance 33. Accordingly, the movement of the lance 33 to the evacuation space 45 is regulated, and the terminal 15 is engaged doubly.

At this time, simultaneously, in the lance regulating rod 81, the depressing protrusion 85 protruding to the lower surface side depresses the clamping plate part 67 of the thermistor 19 toward the top board 43 of the sensor fixing part 55. As a result, the clamping plate part 67 of the thermistor 19 is pushed to be brought into close contact with the top board 43. In addition, the front holder 21 which receives the counterforce thereby becomes in a press-in state with respect to the housing 13.

Next, the description will be given about an effect of the above-described configuration.

Figure 8:
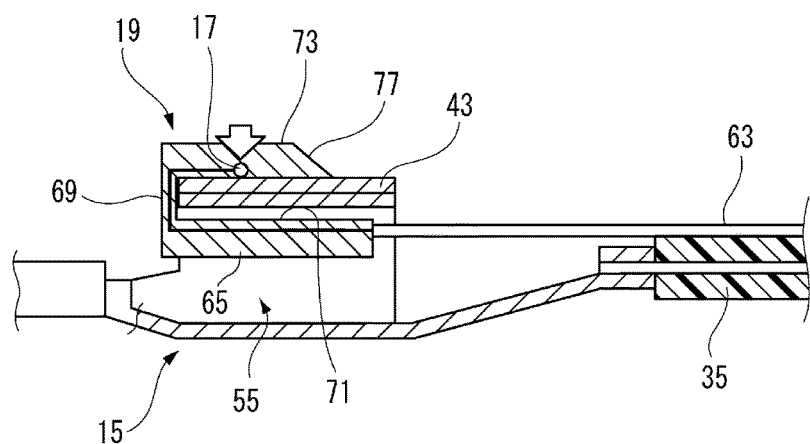
FIG. 8 is an enlarged sectional view of a state where an upper portion of the thermistor is pressed to the terminal.

FIG. 8A is an enlarged sectional view of a state where an upper portion of the thermistor 19 is pressed and attached to the terminal 15.

In the charging connector 11 according to this first embodiment, the front holder 21 is inserted into the housing 13 in which the terminal 15 is engaged. The front holder 21 is engaged in the housing 13 by the holder claw 83 which is engaged in the housing 13, and the slipping from the housing 13 is regulated. In a state where the front holder 21 is mounted in the housing 13, the insertion tip of the lance regulating rod 81 is inserted into the evacuation space 45, and the movement of the lance 33 in a direction to release the engagement of the terminal 15 is regulated. That is, the front holder 21 engages the terminal 15 doubly.

At this time, simultaneously, the front holder 21 presses the thermistor element 17 of the thermistor 19 which is positioned between the front holder 21 and the terminal 15 toward the terminal 15 by the depressing protrusion 85 (see FIG. 7) of the lance regulating rod 81. The thermistor element 17 is pressed by the front holder 21, so as to be brought into close contact with the terminal 15 directly or through the molding resin material. Incidentally, in the above-described configuration, an example has been described which the depressing protrusion 85 as a pressing part is formed in the lance regulating rod 81. However, in the lance regulating rod 81, an indent may protrude instead of the depressing protrusion 85. In addition, the pressing part of the invention can be configured such that a plate thickness itself in a direction orthogonal to the inserting direction of the lance regulating rod 81 is thickened to push the thermistor element 17 to the terminal 15.

In the charging connector 11 of this first embodiment, when the terminal 15 generates heat, the temperature is transmitted to the thermistor element 17 which is brought into close contact with the terminal 15 directly or the molding resin material, and a temperature change is detected through the signal wire 63. The heat from the terminal 15 is preferably transmitted by thermal conduction to the thermistor element 17 which is brought into close contact with the terminal 15. Unlike a conventional structure, in the charging connector 11, there is no possibility that a gap is interposed between the terminal 15 and the thermistor element 17. That is, air having a low thermal conductivity is not interposed between the terminal 15 and the thermistor element 17, and the thermal conduction is performed directly or through the molding resin material. As a result, since a thermal resistivity (an inverse number of the thermal conductivity) is small, the heat is easily transmitted compared to the conventional structure.

In addition, when the front holder 21 is mounted in the housing, the thermistor element 17 is pressed and biased to the terminal 15 directly or through the molding resin material. Thus, the front holder 21 becomes in a press-in structure which receives the counterforce from the terminal 15. The front holder 21 becomes in the press-in structure, so as to prevent that a clearance occurs between the thermistor element 17 and the terminal 15 by an external force, a temperature change, and the like.

In addition, in the charging connector 11 of this first embodiment, when the front holder 21 is inserted, the thermistor 19 is pressed and biased toward the top board 43 of the terminal 15 by the depressing protrusion 85 which protrudes to be close to the base end side from the insertion tip in the lance regulating rod 81 of the front holder 21 abutting on the lance 33 in a direction orthogonal to the inserting direction of the front holder 21, and is pushed to the terminal 15. That is, the depressing protrusion 85 of the lance regulating rod 81 is pressed and biased toward the top board 43 of the terminal 15 by an elastic repulsion force of the insertion tip side of the lance regulating rod 81 which is bent and deformed in a direction orthogonal to the inserting direction. Accordingly, the thermistor element 17 is brought into close contact with the terminal 15 directly in a case where the thermistor element 17 is revealed from the thermistor 19 or through the molding resin material in a case where the thermistor element 17 is covered with the molding resin material. The thermistor 19 and the terminal 15 are pressed and biased in a direction orthogonal to the inserting direction of the front holder 21. Thus, even in a case where the external force acts in the inserting direction of the front holder 21, a close contact state can be maintained stably without separation.

In addition, in the charging connector 11 of this first embodiment, the load change of the pressure of the front holder 21 can be performed by the change of the thermistor shape, and the accuracy of the temperature detection can be adjusted without the large change of the existing product. In addition, the signal wire 63 can be led out to the outside from the inside of the housing 13 in which a space is provided relatively, and thus, a large change is not necessary in the structure of the housing 13.

Next, the description will be given about a charging connector according to a second embodiment of the invention.

Figure 9A:
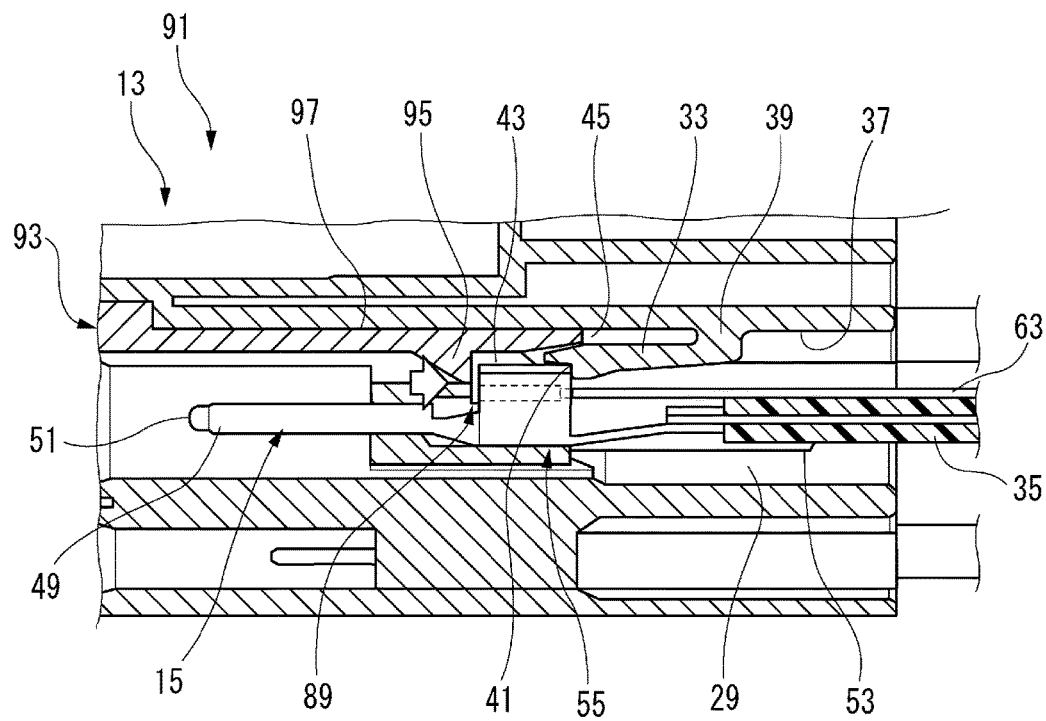
FIG. 9A is a sectional view of main portions of a connector according to a second embodiment in a state where a front portion of a thermistor is pressed to a terminal.
Figure 9B:
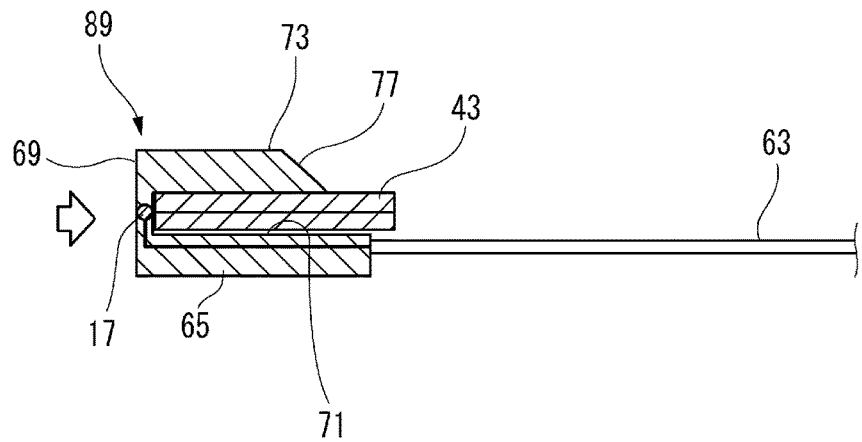
FIG. 9B is an enlarged sectional view of the thermistor illustrated in FIG. 9A.

FIG. 9A is a sectional view of main portions of a charging connector 91 according to the second embodiment in which a front portion of a thermistor 89 is pressed to the terminal 15, and FIG. 9B is an enlarged sectional view of the thermistor 89 illustrated in FIG. 9A.

In the charging connector 91 according to the second embodiment, the thermistor 89 including the thermistor element 17 is molded of a molding resin material. In the thermistor 89, the thermistor element 17 is buried (molded) into the perpendicular plate part 69.

The front holder 93 of the charging connector 91 has a lance regulating rod 97 in which a pressing protrusion 95 is formed as a pressing part different from the depressing protrusion 85 of the front holder 21. The pressing protrusion 95 has a pressing surface which faces the perpendicular plate part 69 of the thermistor 89 in parallel. In the charging connector 91, the thermistor element 17 of the thermistor 89 is pressed and biased by the front holder 93 mounted in the housing 13 in the same direction as the inserting direction of the front holder 93 and is brought into close contact with the terminal 15 directly or through the molding resin material.

In the charging connector 91 of this second embodiment, when the front holder 93 is inserted, the perpendicular plate part 69 of the thermistor 89 is pressed and biased by the front holder 93 in the same direction as the inserting direction of the front holder 93, and is pushed to the front end surface of the top board 43 of the terminal 15. That is, the pressing protrusion 95 of the lance regulating rod 97 can press and bias the thermistor 89, which is provided in a position to face the inserting direction, toward the front end surface of the terminal 15 by the inserting force at the time of being mounted in the housing 13. Accordingly, the thermistor element 17 provided in the perpendicular plate part 69 is brought into close contact with the terminal 15 directly in a case where the thermistor element 17 is revealed from the thermistor 89, or through the molding resin material in a case where the thermistor element 17 is covered with the molding resin material. The thermistor 89 and the terminal 15 are pressed and biased in the same direction as the inserting direction of the front holder 93. Thus, even in a case where the external force acts in a direction orthogonal to the inserting direction of the front holder 93, a close contact state can be maintained stably without separation. Also in the charging connector 91, the signal wire 63 can be led out to the outside from the inside of the housing 13 in which a space is provided relatively, and thus, a large change is not necessary in the structure of the housing 13.

Next, the description will be given about a third embodiment of the charging connector according to the invention.

Figure 10A:
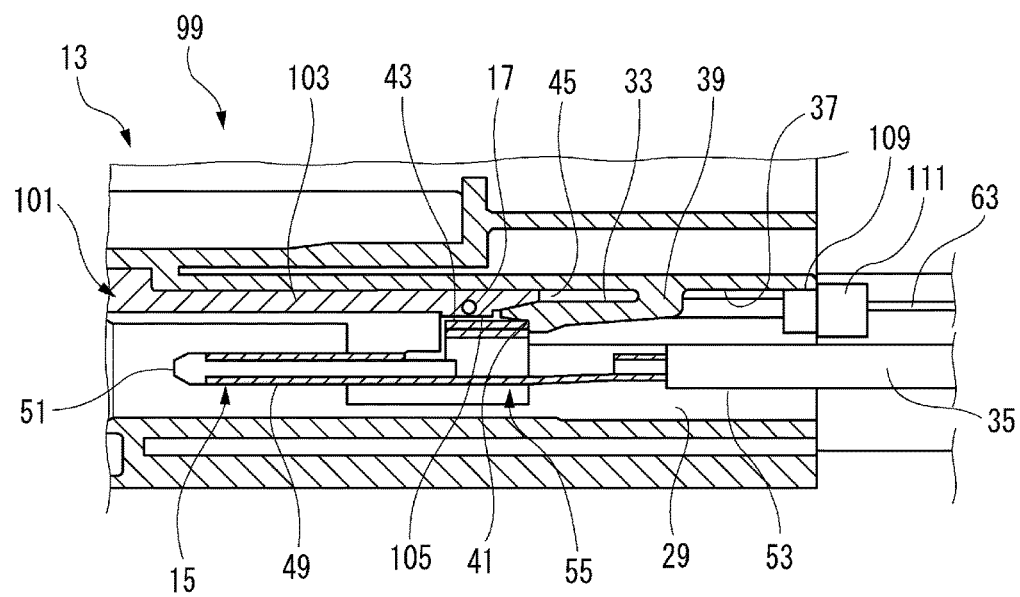
FIG. 10A is a sectional view of main portions of a connector according to a third embodiment in a state where a thermistor element is provided in a terminal holding member.
Figure 10B:
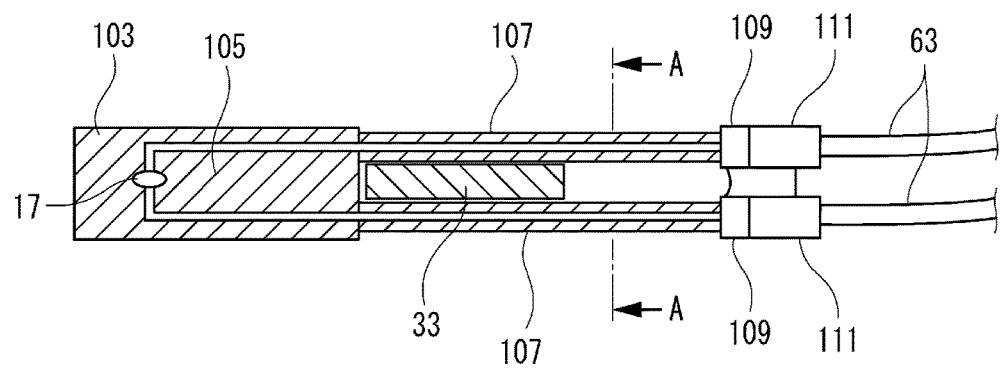
FIG. 10B is a horizontal plan view illustrating a configuration of the terminal holding member illustrated in FIG. 10A.
Figure 10C:
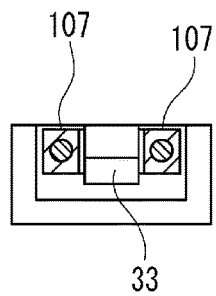
FIG. 10C is a sectional view taken along line A-A of FIG. 10B.

FIG. 10A is a sectional view of main portions of a charging connector 99 according to the third embodiment in which the thermistor element 17 is provided in a front holder 101, FIG. 10B is a horizontal plan view illustrating the configuration of the front holder 101 illustrated in FIG. 10A, and FIG. 10C is a sectional view taken along line A-A of FIG. 10B.

In the charging connector 99 according to this third embodiment, the front holder 101 is molded of the molding resin material while including the thermistor element 17, and the thermistor element 17 is pressed and biased by the front holder 101 mounted in the housing 13 and is brought into close contact with the terminal 15 directly or through the molding resin material.

The thermistor element 17 is buried (molded) to a portion protruding as a close contact protrusion 105 in a lower surface of the lance regulating rod 103 of the front holder 101. Also in this case, although the thermistor element 17 is partially revealed from the close contact protrusion 105, the thermistor element 17 may be covered with the molding resin material forming the close contact protrusion 105. When the front holder 101 is mounted in the housing 13, the lance regulating rod 103 regulates the engagement release of the lance 33 in the insertion tip, and the close contact protrusion 105 is brought into close contact with the upper surface of the top board 43 of the sensor fixing part 55 in the terminal 15.

In the front holder 101, a pair of lead leading-out parts 107 which extend to the housing rear side with the lance 33 of the housing 13 interposed therebetween are formed on both sides of the lance regulating rod 103. In the thermistor element 17 provided in the close contact protrusion 105, a pair of the signal wires 63 are buried into the pair of lead leading-out parts 107 and pass to the rear end of the lead leading-out part 107. The lead connector 109 is provided in the rear end of the lead leading-out part 107. When the holder claw 83 is engaged by inserting the lance regulating rod 103 into the housing 13, the close contact protrusion 105 is brought into close contact with the top board 43 of the terminal 15, and the front holder 101 is mounted in the housing 13. At this time, in the lead leading-out part 107, the lead connector 109 protrudes from the rear side of the housing 13. In the front holder 101, when a signal wire connector 111 is connected in the lead connector 109 protruding from the housing 13, the lead of the thermistor element 17 is electronically connected to the outside portion of the housing 13.

In the charging connector 99 of this third embodiment, the front holder 101 is formed of a molding resin material while including the thermistor element 17. When the front holder 101 is inserted into the housing 13, the thermistor element 17 is pushed by the front holder 101 to the top board 43 of the sensor fixing part 55 in the terminal 15. Accordingly, the thermistor element 17 is brought into close contact with the terminal 15 directly in a case where the thermistor element 17 is revealed from the front holder 101 or through the molding resin material in a case where the thermistor element 17 is covered with the molding resin material forming the front holder 101. Also in the charging connector 99, the lead leading-out part 107 can be led out to the outside from the inside of the housing 13 in which a space is provided relatively, and thus, a large change is not necessary in the structure of the housing 13.

In the charging connector 99 of this third embodiment, the thermistor element 17 is provided in the front holder 101. Thus, the above-described case 61 of the thermistor 19 is not provided, and the number of the components can be reduced.

Accordingly, the temperature detection can be performed more accurately by using the charging connector 11, the charging connector 91, and the charging connector 99 according to the above-described embodiments.

Next, the description will be given about a terminal with a sensor according to a fourth embodiment of the invention.

Figure 11A:
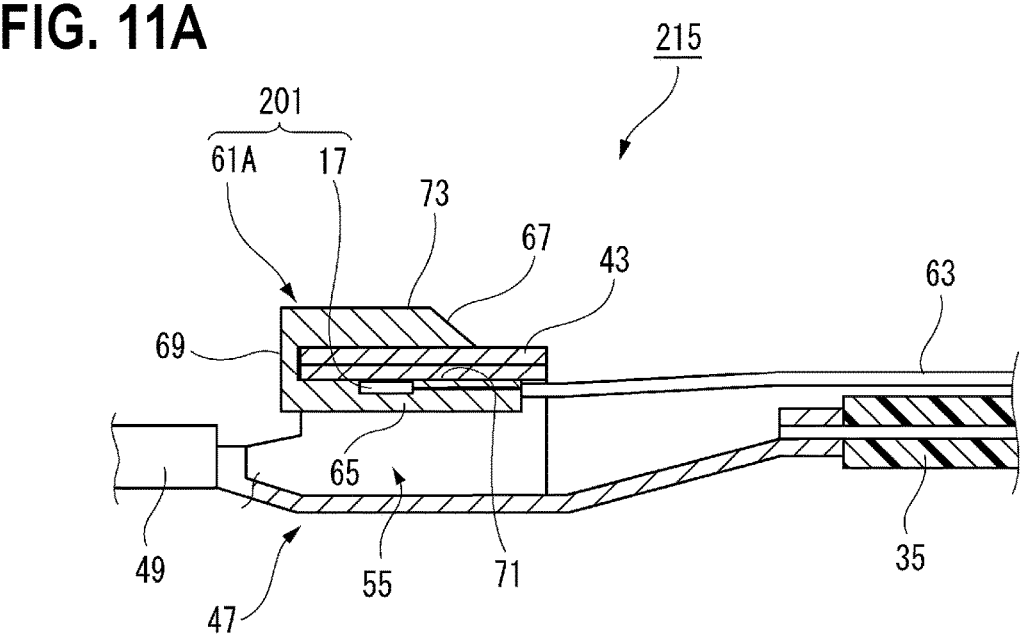
FIG. 11A is an enlarged sectional view of main portions of a terminal with a sensor according to a fourth embodiment of the invention.
Figure 11B:
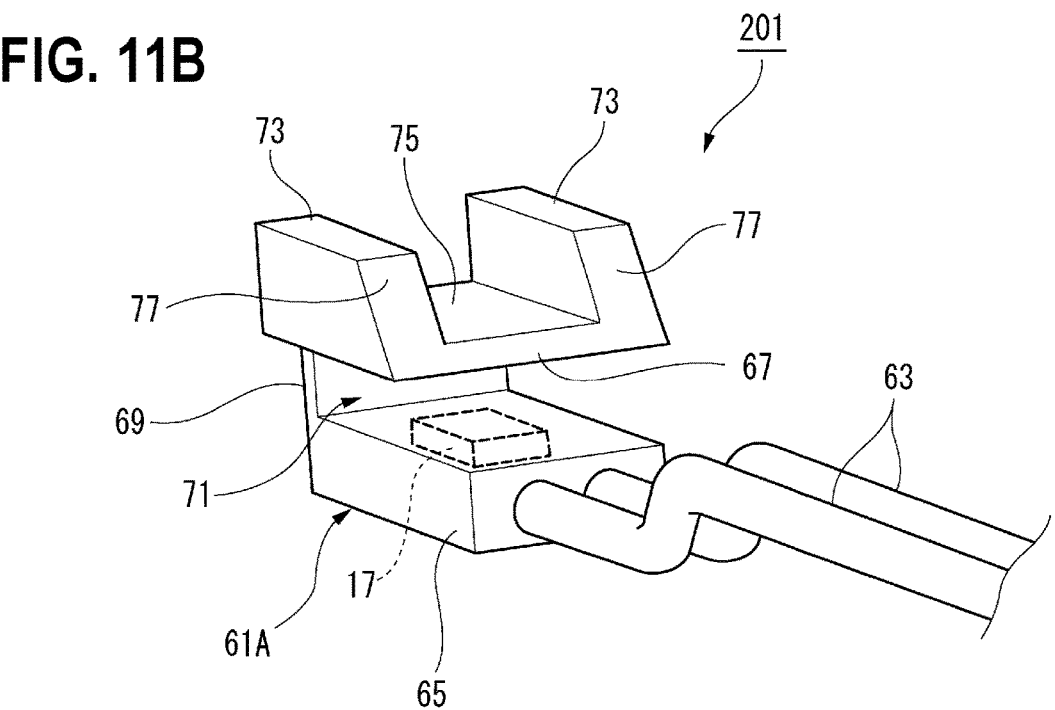
FIG. 11B is an enlarged perspective view of the thermistor illustrated in FIG. 11A when viewed from a side of a wire connection.

FIG. 11A is an enlarged sectional view of main portions of the terminal with a sensor according to the fourth embodiment of the invention, and FIG. 11B is an enlarged perspective view of the thermistor illustrated in FIG. 11A when viewed from the side of a wire connection.

As illustrated in FIG. 11A, a terminal 215 with a sensor according to this fourth embodiment includes the terminal body 47 which has the counterpart terminal contacting part 49 contacted by a counterpart female terminal (counterpart terminal) and the sensor fixing part 55, and a thermistor 201 fixed in the sensor fixing part 55.

The terminal body 47 is formed by bending a conductive plate having a predetermined shape through a press processing. The terminal body 47 includes the counterpart terminal contacting part 49 contacted by a counterpart female terminal (not illustrated), the wire connection part 53 connected in the wire 35, and the cylindrical sensor fixing part 55 which is provided between the counterpart terminal contacting part 49 and the wire connection part 53. The counterpart terminal contacting part 49 is formed in a cylindrical rod shape. That is, the terminal 215 with a sensor serves as a male terminal.

In this fourth embodiment, the sensor fixing part 55 of the terminal body 47 is formed in a rectangular cylindrical shape in which the conventional thermistor formed in a rectangular parallelepiped shape can be mounted. That is, the above-described terminal 15 (see FIG. 2) according to the first embodiment can be used in the terminal 215 with a sensor. In the sensor fixing part 55, the pair of side plate parts 59 are erected from both sides of the bottom plate part 57 illustrated in FIG. 11A, and the upper ends of both side plate parts 59 are bent and overlapped so as to be parallel to the bottom plate part 57, whereby the sensor fixing part 55 is formed in a rectangular cylindrical shape. A portion where the upper ends of the side plate part 59 are overlapped serves as the top board 43. Incidentally, if a portion corresponding to the top board 43 is provided in the terminal body 47, the terminal body 47 may be a new terminal in which the other portion has a different shape in addition to the existing product.

As illustrated in FIG. 11B, the thermistor 201 includes the thermistor element 17 and a case 61A in which the thermistor element 17 is molded of a molding resin material.

The case 61A of this fourth embodiment includes the base part 65 in which the thermistor element 17 is buried, and the clamping plate part 67 which is connected by the perpendicular plate part 69 to be formed in parallel to the base part 65, and has almost the same outer shape as the above-described case 61 (see FIGS. 3A and 3B) of the first embodiment. Thus, detailed description is not provided.

The thermistor element 17 may be entirely covered with the molding resin material, or may be partially revealed from a portion facing the top board 43 in the case 61A. In a case where the thermistor element 17 is configured to be partially revealed from the portion facing the top board 43 in the case 61A, the revealed surface is brought into direct close contact with the top board 43 of the terminal body 47. In addition, in a case where the thermistor element 17 is entirely covered (molded) with the case 61A, the thermistor element 17 is brought into close contact with the terminal body 47 with a thin wall of the molding resin material interposed therebetween. A lead is connected in the thermistor element 17, and the lead is led out as the pair of signal wires 63 from the case 61A.

In the signal wire 63, a conductor connected in the thermistor element 17 is covered with an insulating coating. In the signal wire 63, the molding resin material of the case 61A adheres to the cover. In the case 61A, a portion where the molding resin material adheres to the cover serves as the rectangular plate-shaped base part 65 which leads out the signal wire 63 rearward.

The case 61A is formed in a substantially U shape in side view in which the opposite side to the signal wire 63 is connected between the base part 65 and the clamping plate part 67 by the perpendicular plate part 69. A space between the base part 65 and the clamping plate part 67 serves as the terminal engagement space 71. In this regard, in the thermistor 201, the base part 65 is inserted into the sensor fixing part 55 having the rectangular cylindrical shape, and the clamping plate part 67 is arranged on the opposite side of the base part 65 with the top board 43 interposed therebetween.

That is, the perpendicular plate part 69 abuts on the front end surface of the sensor fixing part 55, and the thermistor 201 is caught in the terminal body 47 in a state where the top board 43 is inserted into the terminal engagement space 71. The thermistor 201 is held and fixed by the terminal body 47 when the base part 65 and the clamping plate part 67 hold the rear end edge (end edge) of the top board 43 in a plate thickness direction. In this regard, the thermistor 201 held and fixed in the rear end edge of the sensor fixing part 55 does not slip during the housing assembly.

In this fourth embodiment, the thermistor element 17 is buried into the base part 65 of the thermistor 201. The thermistor element 17 may be entirely covered with the molding resin material, or the upper surface thereof may be revealed in the upper surface of the base part 65. The lead connected in the thermistor element 17 passes through the base part 65 and serves as the signal wire 63. The lead may be a conductor of the signal wire 63. In addition, the lead may be employed in which a separate body from the conductor of the signal wire 63 is connected in the conductor of the signal wire 63. In any case, the cover of the signal wire 63 connected in the lead is molded of the molding resin material forming the base part 65.

Accordingly, in the terminal 215 with a sensor according to this fourth embodiment, when the base part 65 and the clamping plate part 67 of the thermistor 201 hold the rear end edge of the sensor fixing part 55 in the plate thickness direction, the thermistor element 17 buried into the base part 65 is brought into close contact with the inner surface of the top board 43 directly or through the molding resin material.

In this regard, when the terminal body 47 generates heat, the temperature is transmitted to the thermistor element 17 which is brought into close contact with the terminal body 47 directly or through the molding resin material, and the temperature is detected. In the thermistor element 17 which is pressed and biased by an elastic holding force of the base part 65 and the clamping plate part 67 and is brought into close contact with the terminal body 47, the heat is transmitted from the terminal body 47 by thermal conduction. Unlike the conventional structure, in the terminal 215 with a sensor, there is no possibility that a gap is interposed between the terminal body 47 and the thermistor element 17. That is, air having a low thermal conductivity is not interposed between the terminal body 47 and the thermistor element 17, and the thermal conduction is performed directly or through the molding resin material. As a result, since the thermal resistivity is small, the heat is easily transmitted compared to the conventional structure, and the temperature detection can be performed more accurately using the terminal 215 with a sensor.

Next, the description will be given about a terminal with a sensor according to the fifth embodiment of the invention.

Figure 12A:
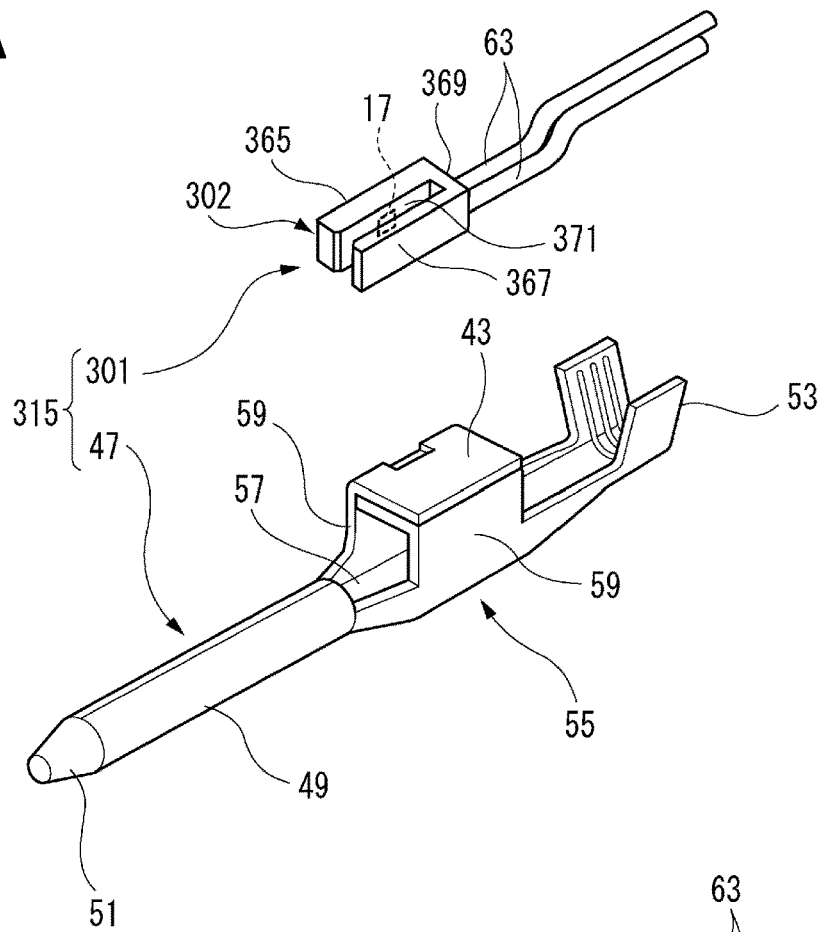
FIGS. 12A and 12B are an exploded perspective view and an assembly perspective view of a terminal with a sensor according to a fifth embodiment of the invention.
Figure 12B:
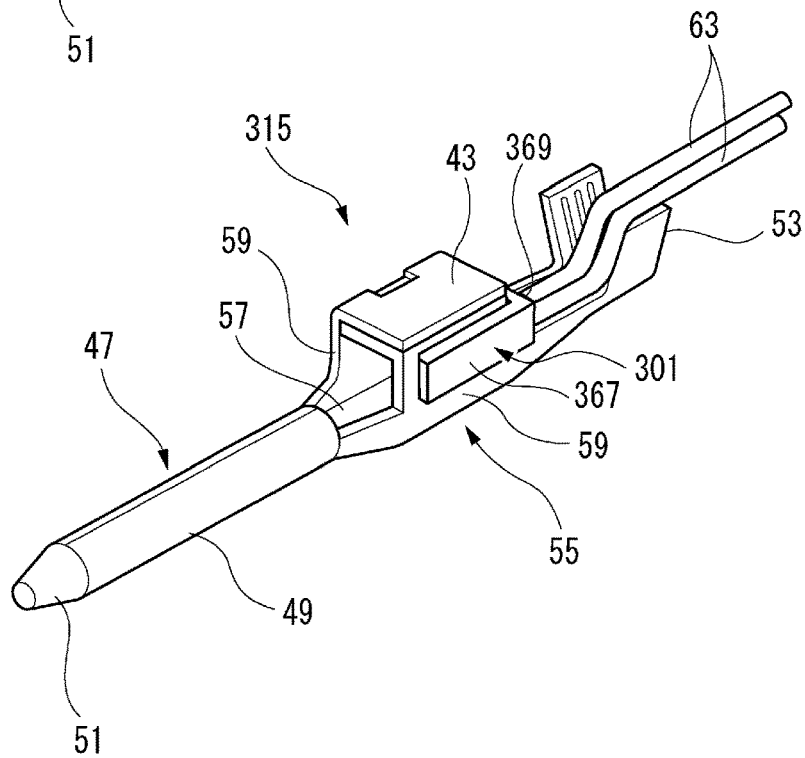
Figure 13A:
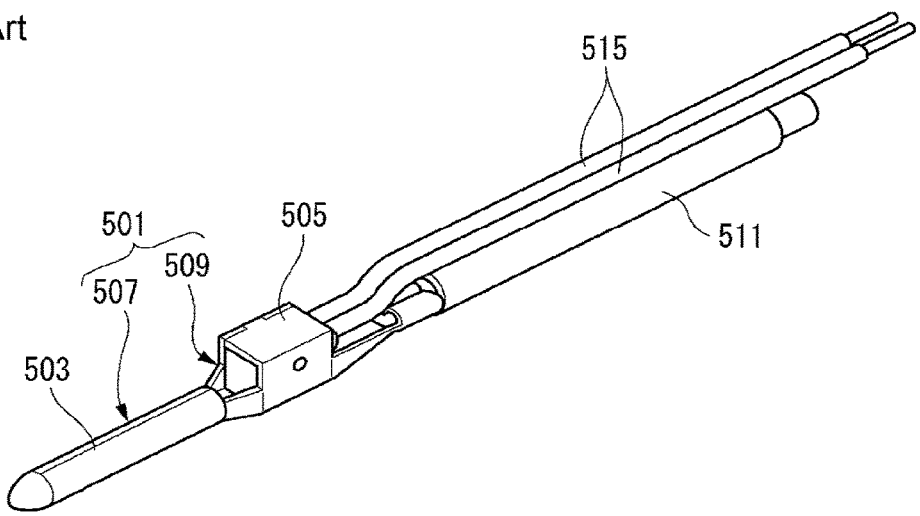
FIG. 13A is a perspective view of a terminal of a conventional charging connector.
Figure 13B:
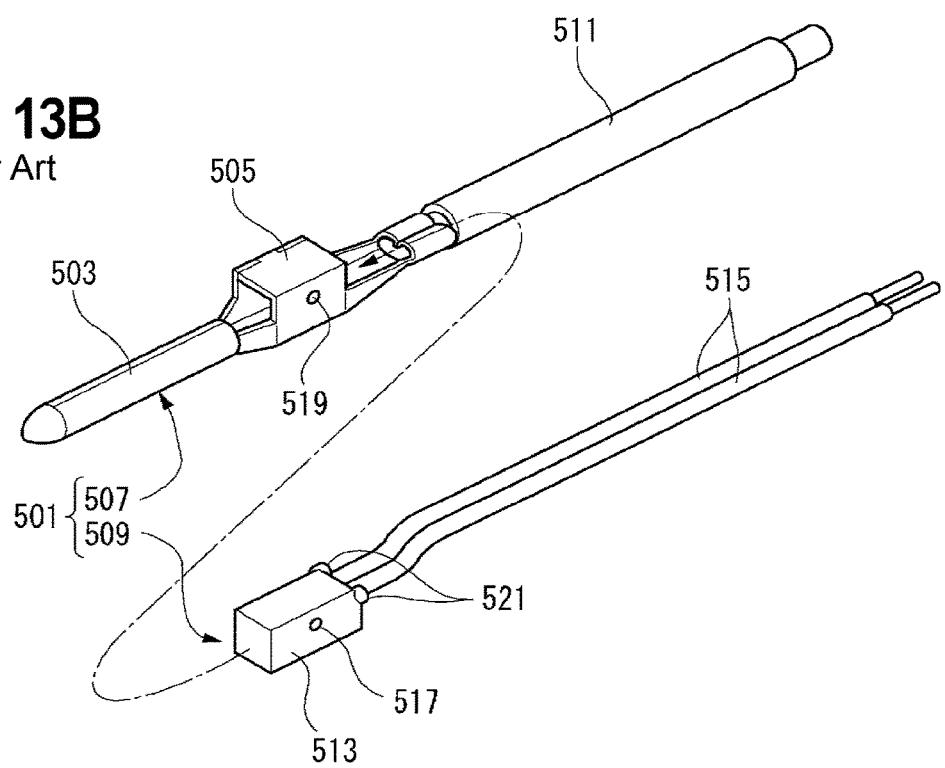
FIG. 13B is a perspective view of a state before a temperature sensor is assembled in a terminal body.

FIGS. 12A and 12B are an exploded perspective view and an assembly perspective view of the terminal with a sensor according to the fifth embodiment of the invention.

As illustrated in FIGS. 12A and 12B, a terminal 315 with a sensor according to this fifth embodiment includes the terminal body 47 which has the counterpart terminal contacting part 49 contacted by a counterpart female terminal (counterpart terminal) and the sensor fixing part 55, and a thermistor 301 fixed in the sensor fixing part 55. Incidentally, detailed description is not provided about the terminal body 47 having the same configuration as that of the above-described fourth embodiment.

As illustrated in FIG. 12A, the thermistor 301 includes the thermistor element 17 and a case 302 in which the thermistor element 17 is molded of a molding resin material. The thermistor 301 of this fifth embodiment is different from the above-described thermistor 201 of the fourth embodiment in that thermistor 301 is held and fixed by the terminal body 47 when a base part 365 and a clamping plate part 367 in the case 302 hold the rear end edge (end edge) of the side plate part 59 in the plate thickness direction.

The case 302 of this fifth embodiment includes the base part 365 in which the thermistor element 17 is buried, and the clamping plate part 367 which is connected by a perpendicular plate part 369 to be formed in parallel to the base part 365.

The thermistor element 17 may be entirely covered with the molding resin material, or may be partially revealed from a portion facing the side plate part 59 in the case 302. In a case where the thermistor element 17 is configured to be partially revealed from the portion facing the side plate part 59 in the case 302, the revealed surface is brought into direct close contact with the side plate part 59 of the terminal body 47. In addition, in a case where the thermistor element 17 is entirely covered with the case 302, the thermistor element 17 is brought into close contact with the terminal body 47 with the thin wall of the molding resin material interposed therebetween. The lead is connected in the thermistor element 17, and the lead is led out as the pair of signal wires 63 from the case 302.

In a signal wire 63, the conductor connected in the thermistor element 17 is covered with an insulating cover. In the signal wire 63, the molding resin material of the case 302 adheres to the cover. In the case 302, a portion where the molding resin material adheres to the cover serves as the rectangular plate-shaped base part 365 which leads out the signal wire 63 rearward.

The case 302 is formed in a substantially U shape in side view in which the opposite side of the signal wire 63 is connected between the base part 365 and the clamping plate part 367 by the perpendicular plate part 369. A space between the base part 365 and the clamping plate part 367 serves as a terminal engagement space 371. In this regard, in the thermistor 301, the base part 365 is inserted into the sensor fixing part 55 having the rectangular cylindrical shape, and the clamping plate part 367 is arranged on the opposite side of the base part 365 with the side plate part 59 interposed therebetween.

That is, in the thermistor 301, the perpendicular plate part 369 abuts on the rear end surface of the side plate part 59 in the sensor fixing part 55, and the side plate part 59 is inserted into the terminal engagement space 371. The base part 365 and the clamping plate part 367 are held and fixed in the terminal body 47 by holding the rear end edge (end edge) of the side plate part 59 in the plate thickness direction. In this regard, the thermistor 301 held and fixed in the rear end edge of the sensor fixing part 55 does not slip during the housing assembly.

In this fourth embodiment, the thermistor element 17 is buried into the base part 365 of the thermistor 301. The thermistor element 17 may be entirely covered with the molding resin material, or the upper surface thereof may be revealed in the inner surface of the base part 365. The lead connected in the thermistor element 17 passes through the base part 365 and serves as the signal wire 63. The lead may be a conductor of the signal wire 63. In addition, the lead is a separate body from the conductor of the signal wire 63, but may be connected in the conductor of the signal wire 63. In any case, the cover of the signal wire 63 connected in the lead is molded of the molding resin material forming the base part 365.

Accordingly, in the terminal 315 with a sensor according to this fifth embodiment, when the base part 365 and the clamping plate part 367 of the thermistor 301 hold the rear end edge of the side plate part 59 in the sensor fixing part 55 in the plate thickness direction, the thermistor element 17 buried into the base part 365 is brought into close contact with the inner surface of the side plate part 59 directly or through the molding resin material.

In this regard, when the terminal body 47 generates heat, the temperature is transmitted to the thermistor element 17 which is brought into close contact with the terminal body 47 directly or through the molding resin material, and the temperature is detected. In the thermistor element 17 which is pressed and biased by an elastic holding force of the base part 365 and the clamping plate part 367 and is brought into close contact with the terminal body 47, the heat is transmitted from the terminal body 47 by thermal conduction. Unlike the conventional structure, in the terminal 315 with a sensor, there is no possibility that a gap is interposed between the terminal body 47 and the thermistor element 17. That is, air having a low thermal conductivity is not interposed between the terminal body 47 and the thermistor element 17, and the thermal conduction is performed directly or through the molding resin material. As a result, since the thermal resistivity is small, the heat is easily transmitted compared to the conventional structure, and the temperature detection can be performed more accurately by using the terminal 315 with a sensor.

In addition, in the terminal 315 with a sensor according to this fifth embodiment, the thermistor 301 is held and fixed in the side plate part 59 without the top board 43. In this regard, the thermistor 301 which does not interfere with the lance 33 of the housing 13 is mounted in the rear end edge of the sensor fixing part 55. Accordingly, in the terminal 315 with a sensor, an operation of mounting the thermistor 301 in the terminal body 47 is easily performed compared to the above-described terminal 215 with a sensor of the fourth embodiment in which the thermistor 201 is mounted in the front end edge of the sensor fixing part 55.

Incidentally, the terminal 315 with a sensor according to this fifth embodiment may be a terminal body in which only the side plate part 59 is erected in the bottom plate part 57 although a portion corresponding to the top board 43 is provided in the sensor fixing part 55. In addition, the thermistor 301 can be held and fixed in a protruding piece part protruding in the sensor fixing part.

Herein, the features of the above-described connector according to the embodiment of the invention will be concisely listed below.

[1] A connector (charging connector 11) including:
a terminal (15);
a housing (13) which has a terminal receiving chamber (29) into which the terminal (15) is inserted, and is formed with a flexible piece (lance 33) which prevents the terminal (15) in the terminal receiving chamber (29) from slipping;
a terminal holding member (front holder 21) which is mounted in the housing (13), and abuts on the flexible piece (lance 33) which prevents slipping of the terminal (15) so as to regulate an engagement release of the flexible piece (lance 33); and
a thermistor element (17) which is pressed and biased by the terminal holding member (front holder 21) mounted in the housing (13) to be brought into close contact with the terminal (15) directly or through the molding resin material.

[2] The connector (charging connector 11) according to the above-described [1] in which a thermistor (19) including the thermistor element (17) is molded of the molding resin material, and the thermistor element (17) of the thermistor (19) is pressed and biased toward the terminal (15) by a pressing part (depressing protrusion 85) which protrudes to be close to a base end side from the insertion tip which abuts on the flexible piece (lance 33) of the terminal holding member (front holder 21) mounted in the housing (13) in a direction orthogonal to an inserting direction of the terminal holding member (front holder 21), and is brought into close contact with the terminal (15) directly or through the molding resin material.

[3] The connector (charging connector 91) according to the above-described [1] in which a thermistor (89) including the thermistor element (17) is molded of the molding resin material, and the thermistor element (17) of the thermistor (89) is pressed and biased by the terminal holding member (front holder 93) mounted in the housing (13) in the same direction as an inserting direction of the terminal holding member (front holder 93), so as to be brought into close contact with the terminal (15) directly or through the molding resin material.

[4] The connector (charging connector 99) according to the above-described [1] in which the terminal holding member (front holder 101) is molded of the molding resin material while including the thermistor element (17), and the thermistor element (17) is pressed and biased by the terminal holding member (front holder 101) mounted in the housing (13), so as to be brought into close contact with the terminal (15) directly or through the molding resin material.

[5] A terminal with a sensor (215, 315) including:

a terminal body (47) having a counterpart terminal contacting part (49) contacted by the counterpart terminal and a sensor fixing part (55); and a thermistor (201, 301) fixed in the sensor fixing part, in which the thermistor has a thermistor element (17) and a case (61A, 302) in which the thermistor element is molded of a molding resin material, the case has a base part (65, 365) in which the thermistor element is buried, and a clamping plate part (67, 367) which is connected by a perpendicular plate part (69, 369) to be formed in parallel to the base part, and when the base part and the clamping plate part hold an end edge (front end edge, rear end edge) of the sensor fixing part in a plate thickness direction, the thermistor element is brought into close contact with the terminal body directly or through the molding resin material.

Incidentally, the invention is not limited to the above-described embodiments, and a modification, a variation, or the like is allowable. In addition, a material, a shape, a size, the number, a location, or the like of each component in the above-described embodiments are arbitrary and not limited as long as they can attain the invention.

The present application is based on Japanese Patent Application (No. 2015-175773) filed on Sep. 7, 2015. The contents thereof are incorporated hereinto by reference.

INDUSTRIAL APPLICABILITY

According to the connector of the invention, the connector can be provided which can perform the temperature detection more accurately. The invention with such an effect is effectively applied to a charging connector.

REFERENCE SIGNS LIST 11, 91, 99: charging connector (connector)
13: housing
15: terminal
17: thermistor element
19, 89: thermistor
21, 93, 101: front holder (terminal holding member)
29: terminal receiving chamber
33: lance (flexible piece)

The invention claimed is:

1. A connector comprising:
a terminal;
a housing that has a terminal receiving chamber into which the terminal is inserted, and is formed with a flexible piece which prevents the terminal in the terminal receiving chamber from slipping;
a terminal holding member that is mounted in the housing, and abuts on the flexible piece which prevents slipping of the terminal so as to regulate an engagement release of the flexible piece; and
a thermistor element that is pressed and biased by the terminal holding member mounted in the housing to be brought into close contact with the terminal directly or through a molding resin material,
wherein a thermistor including the thermistor element is molded of the molding resin material.

2. The connector according to claim 1, wherein
the thermistor element of the thermistor is pressed and biased toward the terminal by a pressing part which protrudes to be close to a base end side from the insertion tip which abuts on the flexible piece of the terminal holding member mounted in the housing in a direction orthogonal to an inserting direction of the terminal holding member, and is brought into close contact with the terminal directly or through the molding resin material.

3. The connector according to claim 1, wherein
the thermistor element of the thermistor is pressed and biased by the terminal holding member mounted in the housing in the same direction as an inserting direction of the terminal holding member, so as to be brought into close contact with the terminal directly or through the molding resin material.

4. A connector comprising,
a terminal;
a housing that has a terminal receiving chamber into which the terminal is inserted, and is formed with a flexible piece which prevents the terminal in the terminal receiving chamber from slipping;
a terminal holding member that is mounted in the housing, and abuts on the flexible piece which prevents slipping of the terminal so as to regulate an engagement release of the flexible piece; and
a thermistor element that is pressed and biased by the terminal holding member mounted in the housing to be brought into close contact with the terminal directly or through a molding resin material,
wherein
the terminal holding member is molded of the molding resin material while including the thermistor element, and
the thermistor element is pressed and biased by the terminal holding member mounted in the housing, so as to be brought into close contact with the terminal directly or through the molding resin material.

* * * * *